G. DICK.
BABY CARRIAGE.
APPLICATION FILED APR. 17, 1915.

1,169,622.

Patented Jan. 25, 1916.
3 SHEETS—SHEET 2.

WITNESSES
S. E. Dade
C. E. Trainer

INVENTOR
GOLA DICK
BY Munn & Co.
ATTORNEYS

UNITED STATES PATENT OFFICE.

GOLA DICK, OF WAUKESHA, WISCONSIN.

BABY-CARRIAGE.

1,169,622.

Specification of Letters Patent.

Patented Jan. 25, 1916.

Application filed April 17, 1915. Serial No. 22,017.

*To all whom it may concern:*

Be it known that I, GOLA DICK, a citizen of the United States, and a resident of Waukesha, in the county of Waukesha and State of Wisconsin, have invented a new and useful Improvement in Baby-Carriages, of which the following is a specification.

My invention is an improvement in baby carriages, and the invention has for its object to provide a carriage which may be quickly and easily transformed from a four wheel carriage to a two wheel or sulky carriage, the carriage being designed to travel on the two wheels, except when going over a curbing or the like when the carriage may be quickly converted into a four-wheel vehicle to provide for an easy passage of the curbing.

The present embodiment of the invention comprises a body, composed of sides, each of which has an extension at its forward end and near the bottom thereof, and the extensions of the two sides are connected at their front. The body is completed by a back, a seat, and a foot board, all of which will be later described in detail.

Each of the sides consists of an upper longitudinal bar 1, a front bar 2 pivoted to the front end of the adjacent bar 1, and a rear bar 3, also pivoted to the bar 1 but intermediate the ends thereof. The bars 1, 2 and 3 and a lower longitudinal bar 4 constitute an open frame, which is closed by a covering 5 of suitable material, the said covering being secured to the bars 1, 2 and 3, as indicated in Fig. 3, on the inner sides of the said bars.

Each bar 3 is pivoted at its lower end to the rear end of the adjacent bottom bar 4, and an extension is provided for the body, the said extension consisting of a substantially U-shaped bar, composed of a body 6 and sides 7. Each of the sides 7 is connected at its rear end to an angle bracket 8, and the said bars 7 extend forwardly and upwardly to their connection with the body 6 of the bar, and it will be noted from an inspection of Figs. 1 and 3 that this body 6 of the bar has its wide dimension almost horizontal, and that the said body is at a considerably higher level than the rear ends of the side bars 7.

Figures 3, 8:
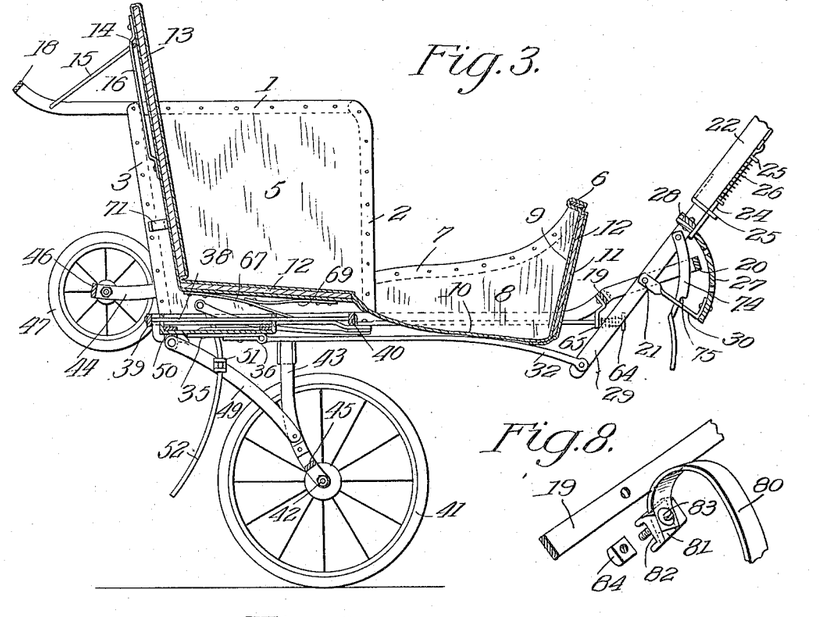
Fig. 3 is a section on the line 3—3 of Fig. 2.
Fig. 8 is a detail perspective view showing the connection between the runners and the carriage.

A covering of flexible material is connected to the bar 6—7, as shown in Fig. 3, and this covering is connected to both arms and body of the bar. The sides 8ª of the cover depend from the sides 7 of the U-shaped bar, and the front portion 9 of the covering is connected at its upper end to the body 6 of the U-shaped bar 6—7 by folding the edge of the covering around the said body. The portion 9 of the covering depends from the bottom downward to the bottom of the body of the carriage and is then extended rearwardly as shown at 10 to its connection with the seat to be later described. The portion 9 of the covering is reinforced or doubled, the reinforcement 11 being in front of the portion 9, and a plate 12 is arranged between the portions 9 and 11 of the covering. The plate extends from the body 6 of the U-shaped bar to the junction between the portions 9 and 10.

The seat 12 and the back 13 of the body are connected with a flexible material corresponding to the coverings 5, 8, 9, 10 and 11, and it will be noted from an inspection of Fig. 3 that the covering is on both faces of the seat and back, and that the said covering is continuous with the portion 10 before mentioned. The back 13 is supported at its upper end by a bail, the said bail comprising a body 14 and arms 15. The body of the bail is passed between a guide rod 16 secured to the rear face of the back and the back, while the arms extend rearwardly and outwardly, and each arm has an angular lug 17 at its rear end which engages an opening in the adjacent bar 1.

Figure 1:
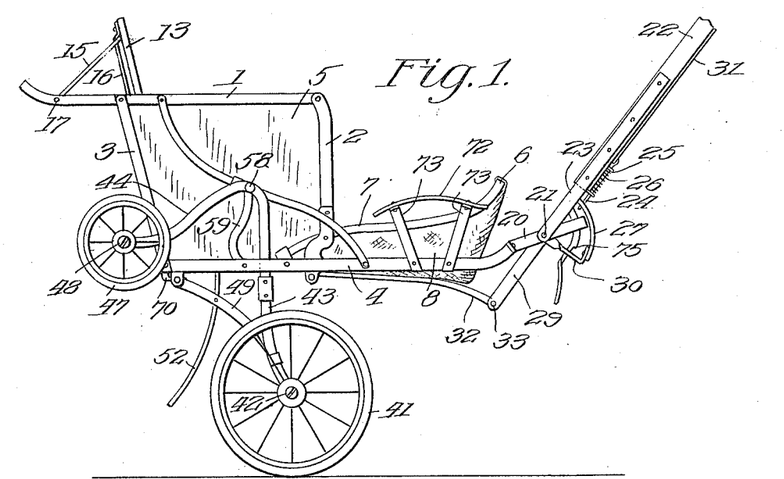
Figure 1 is a side view of the improved carriage.

The bars 1 near their rear ends are bent upwardly slightly, and the rear ends of the two bars are connected by an integral connecting bar 18. The guide rod 16 has its ends offset laterally and secured to the rear face of the back 13 as shown in Figs. 1 and 3, and the said rod is of sufficient length to permit the bail and the back to move freely relatively to each other. The bars 4, before mentioned, extend from their pivotal connection with the bars 3 forwardly beyond the extension, and in front of the extension they are connected by an integral connecting bar 19, the said bar extending transversely of the carriage.

A U-shaped bracket 20 is connected with the connecting bar 19 at approximately its center, and a bolt 21 is journaled transversely of the said bracket in the arms of the bracket. A tongue is connected to the bolt 21, the tongue comprising a body 22 and arms 23, secured to the rear end of the body and extending longitudinally from the tongue alongside each other in spaced relation, and the said arms are pivoted to the bolt 21 outside of the bracket 20.

The arms 23 lap on opposite sides of the tongue body and are riveted thereto as shown more particularly in Fig. 1, and the tongue is provided with holding mechanism for holding it in adjusted position. This mechanism consists of a latch 24 mounted to slide in bearing lugs 25 on the under face of the tongue, and the latch is normally pressed rearwardly by a coil spring 26.

A sector 27 having spaced openings is arranged adjacent to the bracket 20, and one end of the sector is secured to the body 28 of a substantially U-shaped lever 29. The other end of the sector is connected to the bolt 21 by means of a brace 30, having one end pivoted on the bolt, and having the other end secured to the sector. The sector is between the arms 23 of the tongue, and the latch 24 is operated from a suitable handle (not shown) on the tongue, which is connected to the latch by a link 31, the said link being arranged on the under face of the tongue.

It will be evident that when the latch 24 is in engagement with an opening of the sector 27, the tongue will be locked to the U-shaped lever 29 in such manner that this lever must move with the tongue when the said tongue is moved on the bolt 21. The arms of the U-shaped lever 29 converge toward their rear end and the said arms lap upon opposite sides of the front end of a link 32, and are pivoted to the link by a bolt and nut 33. The link extends rearwardly beneath the carriage body to a connection with a sliding frame mounted beneath the said body.

The frame comprises a cross plate 34, having at its center a forwardly extending tongue or draft plate 35, and the rear end of the link 32 is pivoted to the draft plate by a bolt and nut 36. The draft plate has spaced bearing lugs between which the rear end of the link is received, and the bolt is passed through the registering lugs and an opening in the link. The draft plate 35 is braced against the plate 34 by inclined braces 37, and the frame slides on a guide rod 38, held longitudinally of the carriage and rigid with respect thereto.

The draft plate 35 before mentioned, has upstanding lugs at its ends, and the lugs are provided with openings engaging the rod. The rod is held by cross bars 39 and 40, respectively, extending transversely of the frame at the rear end and intermediate the ends respectively of the frame. It will be evident that when the tongue 22 is made rigid with the U-shaped lever 29 by means of the latch mechanism and the said tongue is swung, the link 32 will constrain the sliding frame to move longitudinally of the carriage. This sliding frame is connected with the front wheels 41, in a manner to be presently described, and by means of the sliding frame the wheels may be moved with respect to the body to support the body in various positions with respect to the wheels.

The wheels in the present instance are rubber tired, and each is journaled on a stub shaft 42 held at the lower end of one arm 43 of a pedestal of substantially U-shape, and consisting of the arm 43 and an integral arm 44. One of the pedestals is arranged at each side of the frame, and near their lower ends the arms 43 of the pedestal are connected by a cross bar 45. The arms 44 of the pedestal are connected by a cross bar 46 at their rear or lower ends, and rear wheels 47 are journaled on stub shafts 48, extending laterally from the arms 44 of the pedestals near the bar 46.

Figure 2:
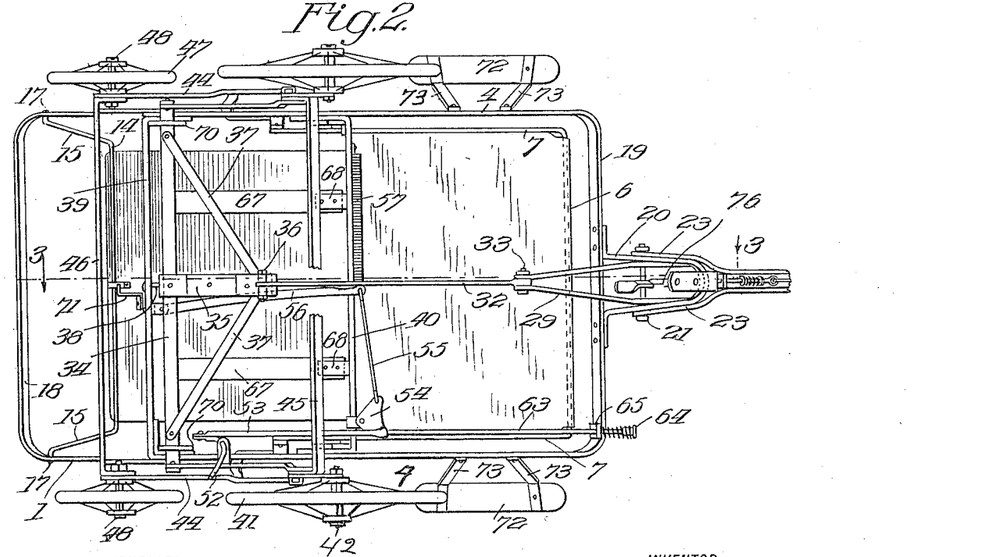
Fig. 2 is a bottom plan view with parts broken away.

The bar 46 as shown in Fig. 2, has angular portions at its ends which lap upon inner faces of the arms 44, and are secured thereto in any suitable or desired manner. The wheels 47 are in the present intsance rubber tired, and the said wheels are of smaller diameter than the main wheels 41. A plate 49 is arranged between the arm 43 of each pedestal and an angular lug 50 on the adjacent end of the cross bar 34 of the sliding frame, the plates 49 being pivoted to the pedestal arms and to the lugs at their respective ends.

One of the plates 49 has a stirrup 51 pivoted thereto on the inner face of the plate, the body of the stirrup being pivoted to the plate, and the arms of the stirrup have openings which engage an arc-shaped rod 52, supported in a manner to be described. The rod 52 is pivoted at its upper end to the rear end of a link 53, and the front end of the link is pivoted to one end of a rock lever 54, mounted to rock on the bar 40, before mentioned.

The rock lever is pivoted intermediate its ends to the bar 40, and a link 55 connects the other end of the rock lever to the front end of a lever 56. The rear end of the lever 56 is pivoted to a bracket on the bar 39, before mentioned, and a coil spring 57 is arranged between the front end of the lever and the bar 40 before mentioned, one end of the spring being connected to the lever and the other end of the spring being connected to the bar 40 at the opposite side of the carriage from the rock lever 54.

The pedestals 43—44, before mentioned, are mounted to swing, the body of each pedestal being pivoted as indicated at 58 to the upper end of a swinging lever 59. The lower end of each of the levers 59 is rigidly secured to the adjacent side bar 4 before mentioned, and the pedestals swing on the connections 58. The cross bar 34 of the sliding frame before mentioned, is connected at its ends to the arms 43 of the pedestals by means of the links 49 before mentioned.

Each link 49 is pivoted at its front end to the arm 43 of the adjacent pedestal and at its rear end each of the said arms is pivoted to a depending lug 50 on the adjacent end of the bar 34. With this arrangement it will be evident that when the tongue connected to the lever 29 as before mentioned, is swung with its upper end rearwardly for instance, the link 32 will be drawn forward as will also the sliding frame.

The pedestals will be swung on their pivotal connections 58 in such manner as to raise the forward arm 43 with respect to the rear arm 44, and if this movement is continued far enough the rear wheels 47 will also be brought in contact with the ground or other surface upon which the carriage rests. When the swinging movement of the tongue is reversed to cause the upper end to move forwardly, the pedestal will be swung in the opposite direction to raise the rear wheels 47 out of contact with the ground and if the movement is continued far enough the parts will take the position of Fig. 1, so that the carriage is supported entirely by the wheels 41.

Figure 6:
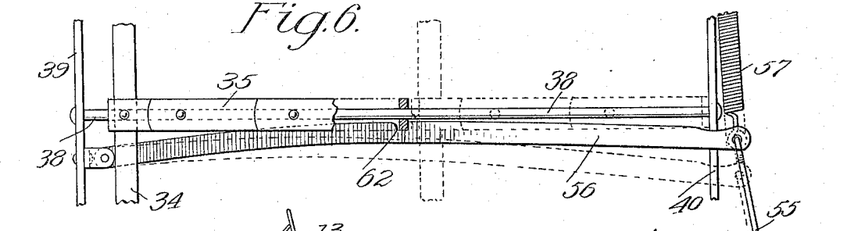
Fig. 6 is a detail plan view of a portion of the latch mechanism.
Figure 7:
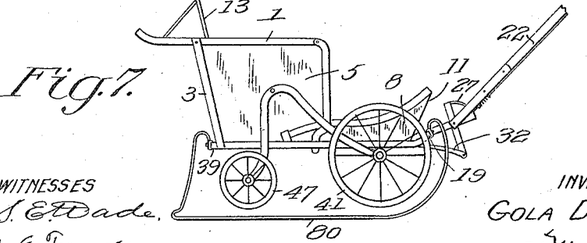
Fig. 7 is a partial side view showing runners attached to the carriage.

The elements 52 to 57 inclusive before described and shown in detail in Fig. 6, constitute a latch mechanism for holding the parts in adjusted position. It will be noted that that edge of the lever 56 remote from the rock lever 54 has a notch 62, which is adapted to be engaged by the edge of one of the up-turned lugs of the draft plate 35, which engages the rod 38, and when the notch is in engagement with the lug, the parts are locked in the position of Fig. 3. The spring 57 holds the lever with the notch in engagement with the lug, and means is provided for permitting the latch mechanism to be released manually. This means is a link 63, pivoted at its rear end to that end of the rock lever 54 to which the link 53 is connected, and the front end of the link is provided with a head 64. The said front end passes through an opening in a depending lug 65, and a coil spring 66 encircles the link between the lug 65 and the head 64, the spring acting normally to press the link forwardly and to hold the parts in adjusted position. To release the latch the link is pushed rearwardly, which swings the rock lever 54, making traction on the link 63 and swinging the lever 56 in a direction to release the lug from the notch 62.

The normal position of the carriage is as shown in Figs. 1 and 3, wherein the carriage is arranged as a sulky or two wheeled vehicle with the body held well above the supporting wheels 41 so that the carriage may be easily handled. The carriage is handled by the tongue, and it is obvious that it may be either pulled or pushed. The latter procedure will, as a rule, be more convenient in that the operator has a good view of the carriage while operating the same.

In order to climb a curb with the carriage in the sulky condition of Fig. 1, the carriage is pushed toward the curb, until the rod 52 strikes the curb. This rod is a trip rod and as it strikes the curb, the rock lever 54 will be swung in a direction to release the lever 56 from the notch of the draft plate 35. When this occurs, the wheels 48 will rest upon the top of the curb, while the wheels 41 will be on the surface below the curb. Now by pushing on the handle 22, while permitting the carriage to fold down into Fig. 4 position, the carriage will easily surmount the curb, in the four wheeled condition, however, instead of in the sulky condition.

The rod 52 is a trip rod which will automatically trip the holding mechanism for holding the carriage in a sulky condition. The lever 56 may also be released by pushing the head 64 of the link 63 to rock the rock lever 54 in a direction to release the lever 56. When the parts are in the position of Figs. 1 and 3, and it is desired to convert the carriage into a four wheeled vehicle it is only necessary to release the latch lever 56 from the lug of the draft plate. While this release may be brought about through the trip rod it may also be brought about through the link 63. When this link is pushed rearwardly by pressure on the head 64 the rock lever 54 will be swung in a direction to pull the latch lever 56 out of engagement with the lug of the draft plate. With the tongue rigid with the lever 29, because of the engagement of the latch 24 with the sector 27, when the latch lever is released as above mentioned, the body of the carriage will swing downwardly into the position of Fig. 4, and the rear wheels because of the swinging of the pedestals with respect to the body will come to rest upon the ground in the Fig. 4 position, while at the same time the tongue will swing upward as shown in the said figure.

Figure 4:
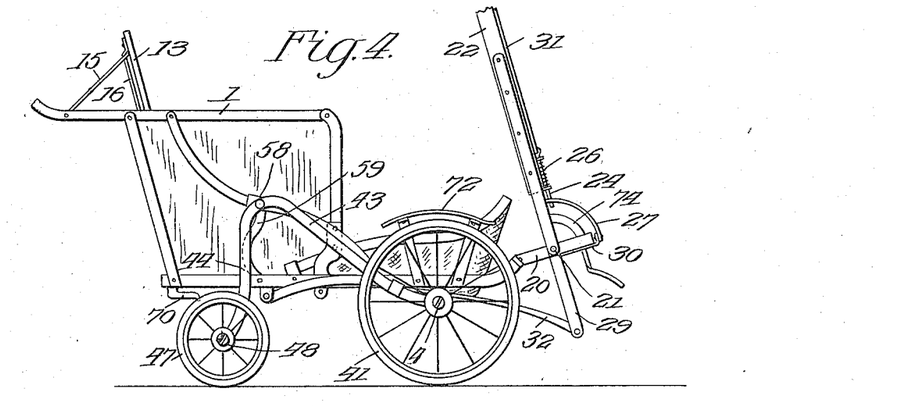
Fig. 4 is a side view with the parts in a different position from that shown in Fig. 1.
Figure 5:
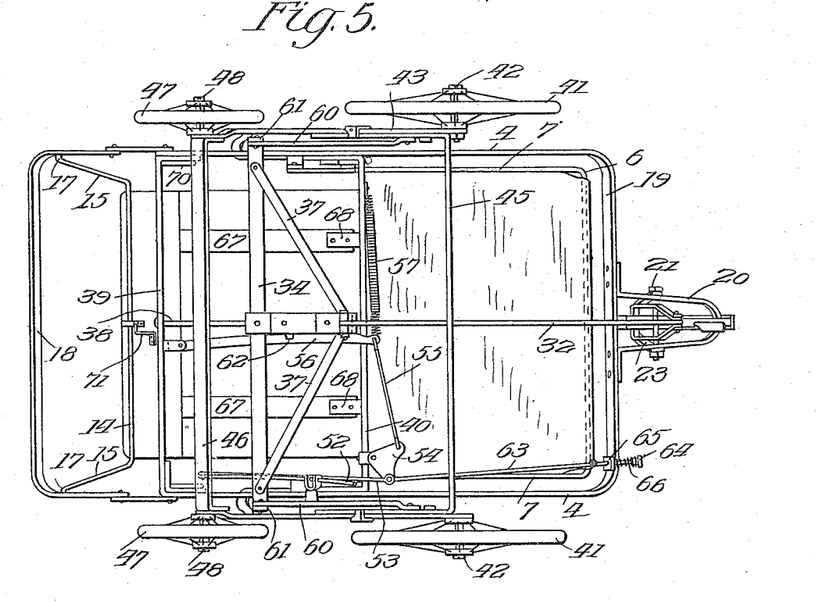
Fig. 5 is a plan view of Fig. 4.

To return the carriage from the four wheeled to the sulky condition it is only necessary to swing the upper end of the tongue forward from the position of Fig.

4, (the tongue meanwhile being rigid with the lever 29), to that of Fig. 1.

It will be evident from a consideration of the construction that when in the two wheeled or sulky condition the small rear wheels are in such position that they will engage above or upon any obstruction that is liable to be met as for instance, a curb, and these wheels so held are ready to drop down upon the curb or other obstruction to permit the vehicle to be pushed forwardly. Sled runners 80 are connected with the carriage, the said runners being connected at one end to the cross bar 19, and at the other to the cross bar 39. The runners are held in place by a special form of clamp. Each of the clamps 81 is channel shaped as shown for fitting over the adjacent cross bar 19 or 39, as the case may be, and each clamp has a transverse groove 82 on the opposite face from the channel for receiving the adjacent end of the runner.

A bolt 83 is passed through registering openings in the clamp, runner and cross bar, and each bolt is engaged by a nut 84 to hold the parts together. These runners are intended for winter use, that is, for use with snow or ice and they may be removed when out of season. This movement of the tongue swings the pedestals on their pivotal connection at 58, lifting the rear wheels 47 and the body with respect to the front wheels 41. The back 13 may be brought into the upright position of Figs. 1 and 3, or into a reclining position, merely by swinging the bail 14—15 downward. When the body of the bail is at the highest point of the guide rod 16 the back of the carriage is in upright position, while when the bail is at the lowest part of the guide rod the upper end of the back may swing rearwardly to bring the back more nearly into alinement with the seat. The seat is spring supported by leaf springs 67, arranged near the opposite ends of the seat, and each spring as shown in Fig. 3, is secured to the under face of the seat at its rear end and to the cross bar 40 at its front end, the connection at the front end being indirect however, through the medium of the angle plates 68. Each angle plate consists of two portions, one of which is secured to the bar 40 and the other to the front end of the adjacent leaf spring 67.

Other leaf springs 69 are arranged between the front of the seat and spring 67. Each of the springs 69 has its front end secured to the seat near the front end thereof, and the rear end of each spring 69 is secured to the adjacent spring 67 intermediate the ends thereof.

With the sled runners in place on the vehicle, when the vehicle is in the position of Fig. 4, these runners will be in engagement with the supporting surface for the carriage, while when the carriage is in the condition of Fig. 3, the runners will be lifted out of contact with the ground or other supporting surface of the carriage. When the carriage is in the condition of Fig. 4 the runners are below the wheels while when the carriage is in the position of Fig. 3 they are above the wheels 41. The runners may be quickly and easily attached or detached.

Catches 70 are provided, on the cross bar 39, for engaging the plate 34 to prevent the said plate from sagging when pushing the carriage. These catches engage below the plate, and act as supports for the said plate when the carriage is being pushed by the handle.

A hook 71 is provided at the rear of the back 15 for engaging beneath the tongue when the carriage is folded. Fenders 72 are provided at the front wheels 41, the said fenders being so arranged that when the carriage is in the four wheeled condition the fenders will be above the wheels. Each of the fenders is supported above the position the wheel will occupy when the parts are in the position of Fig. 4, and each fender is supported from the adjacent bar 4 by means of braces 73.

The lever 29 may be locked from movement with respect to the bracket 20 by means of a latch lever 74. This lever is pivoted to the lever 29 at the junction between the arms, and the lever is provided with a catch 75, for engaging above the body of the bracket 20 to lock the said bracket between the catch and the brace 30. The lever moves alongside the said brace, and the brace is provided with a cutaway portion 76, in which the lever moves, and the ends of which limit the movement of the lever. When the lever 29 is swung upward into the position of Fig. 4, the body of the bracket 20 may be engaged between the catch 75 and the brace 30, by swinging the lower end of the lever 74 forwardly. The body of the bracket 20 is thus locked between the catch 75 and the brace 30, and the lever 29 cannot move with respect to the bracket 20 because the lever 74 is pivoted to the body of the lever 29. The latch thus holds these parts in fixed position, and while they are so held, the tongue 22 may be adjusted with respect to the sector 27. The latch lever 74 thus holds the parts in the position of Fig. 4, that is, with all four wheels in engagement with the supporting surface of the carriage. To release the parts when it is desired to transform the carriage into the sulky condition, the lower end of the latch lever 74 is pressed rearwardly, thus releasing the bracket 20 from the lever 29.

The trip rod 52 when the carriage is in sulky condition is always in position to strike a curb, for instance, at such time that the wheels 47 are directly above the curb and in position to come to rest upon the same when the carriage is tripped from the sulky to the four wheeled condition. At such time, when force is exerted to push the carriage, the force will be applied in such manner that the wheels will rock over the curb. The outer wheels will climb a perpendicular curb of a height of from 12 to 14 inches and as soon as the carriage is over the curb it may be raised into the sulky condition. In order to use the runners it is only necessary to secure them in place by the four screw bolts. When they are on the carriage the carriage may be used in either the sulky condition, that is, on two wheels or as a sled, that is, on the runners. By pushing the handle forward when the sled runners are on the ground, the wheels are raised to their highest position and at such time the lever 74 can be moved to lock the parts in such position so that the wheels will not drag in the snow.

It will be understood that the carriage will not climb a curb with the runners in place unless the curb should be low and with snow or ice on its top.

I claim:—

1. A carriage of the character specified, comprising a body, a pedestal pivoted to the body at each side thereof, each pedestal being approximately V-shaped and comprising a body pivoted to the carriage body and arms diverging forwardly and rearwardly, each arm having at the free end thereof a laterally extending journal pin, a wheel journaled on each journal pin, a sliding frame arranged below the body of the carriage and mounted to slide thereon, a connection between the frame and the forward arms of the pedestals for simultaneously swinging said pedestals when the frame is moved longitudinally of the carriage to bring the four wheels of the pedestals into contact with the supporting surface of the carriage when the pedestals are swung forward or to lift the rear wheels out of contact with the ground when the pedestals are swung rearwardly, latch mechanism engaging the sliding frame for holding the pedestals with the four wheels in contact with the supporting surface of the carriage, means at the front of the carriage for releasing said latch mechanism, a tongue pivoted to the carriage at the front thereof, means at the front of the carriage for operating the sliding frame, and a releasable connection between the tongue and the said operating mechanism for permitting the said mechanism to be operated by the tongue.

2. A carriage of the character specified, comprising a body, a pedestal pivoted to the body at each side thereof, each pedestal being approximately V-shaped and comprising a body pivoted to the carriage body and arms diverging forwardly and rearwardly, each arm having at the free end thereof a laterally extending journal pin, a wheel journaled on each journal pin, a sliding frame arranged below the body of the carriage and mounted to slide thereon, a connection between the frame and the forward arms of the pedestals for simultaneously swinging said pedestals when the frame is moved longitudinally of the carriage to bring the four wheels of the pedestals into contact with the supporting surface of the carriage when the pedestals are swung forward or to lift the rear wheels out of contact with the ground when the pedestals are swung rearwardly, a tongue pivoted to the carriage at the front thereof, means at the front of the carriage for operating the sliding frame, and a releasable connection between the tongue and the said operating mechanism for permitting the said mechanism to be operated by the tongue.

3. A carriage of the character specified, comprising a body, a pedestal pivoted to the body at each side thereof, each pedestal being approximately V-shaped and comprising a body pivoted to the carriage body and arms diverging forwardly and rearwardly, each arm having at the free end thereof a laterally extending journal pin, a wheel journaled on each journal pin, a sliding frame arranged below the body of the carriage and mounted to slide thereon and connected to the pedestals, a substantially U-shaped bracket at the front of the carriage and rigid with the carriage, a lever pivoted to the bracket, a connection between the lever and the sliding frame for operating said frame to swing the pedestals with respect to the carriage to move the rear wheels into and out of contact with the supporting surface of the carriage, a tongue pivoted to the bracket, coöperating latch mechanism in connection with the tongue and the lever for connecting the tongue to the lever to operate said lever by the tongue, and independent and releasable latch mechanism for holding the pedestals in either position.

4. A carriage of the character specified, comprising a body, a pedestal pivoted to the body at each side thereof, each pedestal being approximately V-shaped and comprising a body pivoted to the carriage body and arms diverging forwardly and rearwardly, each arm having at the free end thereof a laterally extending journal pin, a wheel journaled on each journal pin, a sliding frame arranged below the body of the carriage and mounted to slide thereon and connected to the pedestals, a substantially U-shaped bracket at the front of the carriage and rigid with the carriage, a lever pivoted to the bracket, a connection between the lever and the sliding frame for operating said frame to swing the pedestals with respect to the carriage to move the rear wheels into and out of contact with the supporting surface of the carriage, a tongue pivoted to the bracket, coöperating latch mechanism in connection with the tongue and the lever for connecting the tongue to the lever to operate said lever by the tongue.

5. A carriage of the character specified, comprising a body, pedestals pivoted to the opposite sides of the body, each pedestal being approximately V-shaped, the arms thereof diverging from each other, and the forward arm of each pedestal being of greater length, a wheel journaled on each arm of each pedestal, a frame mounted to slide on the body of the carriage at the under side thereof, a connection between the frame and each pedestal for simultaneously swinging the pedestals when the frame is moved longitudinally of the carriage to bring the wheels of the rear arms of the pedestals into and out of contact with the supporting surface for the carriage, a lever at the front of the carriage body, a bracket fixed with respect to the body and to which the lever is pivoted, a connection between the lever and the sliding frame for operating the said frame when the lever is swung on its pivotal connection, a tongue pivoted to the lever, releasable latch mechanism in connection with the tongue and lever for rigidly connecting said tongue and lever, latch mechanism engaging the sliding frame when it is at the end of its movement in a rearward direction, means at the front of the body for releasing the said latch mechanism, and latch mechanism in connection with the lever and the bracket for locking the lever and the bracket with the sliding frame in forward position.

6. A carriage of the character specified, comprising a body, pedestals pivoted to the opposite sides of the body, each pedestal being approximately V-shaped, the arms thereof diverging from each other, a wheel journaled on each arm of each pedestal, a frame mounted to slide on the body of the carriage at the under side thereof, a connection between the frame and each pedestal for simultaneously swinging the pedestals when the frame is moved longitudinally of the carriage to bring the wheels of the rear arms of the pedestals into and out of contact with the supporting surface for the carriage, a lever at the front of the carriage body, a bracket fixed with respect to the body and to which the lever is pivoted, a connection between the lever and the sliding frame for operating the said frame when the lever is swung on its pivotal connection, a tongue pivoted to the lever, and releasable latch mechanism in connection with the tongue and lever for rigidly connecting said tongue and lever for permitting the lever to be operated by the tongue.

7. A carriage of the character specified, comprising a body, pedestals pivoted to the opposite sides of the body, each pedestal being approximately V-shaped, the arms thereof diverging from each other, a wheel journaled on each arm of each pedestal, a frame mounted to slide on the body of the carriage at the under side thereof, a connection between the frame and each pedestal for simultaneously swinging the pedestals when the frame is moved longitudinally of the carriage to bring the wheels of the rear arms of the pedestals into and out of contact with the supporting surface for the carriage, and means at the front of the body and connected with the sliding frame for operating the said frame to simultaneously swing the pedestals.

8. A carriage of the character specified, comprising a body, pedestals pivoted to the opposite sides of the body, each pedestal being approximately V-shaped, a wheel journaled on each arm of each pedestal, a frame mounted to slide on the body of the carriage at the under side thereof, a connection between the frame and each pedestal for simultaneously swinging the pedestals when the frame is moved longitudinally of the carriage to bring the wheels of the rear arms of the pedestals into and out of contact with the supporting surface for the carriage, and means at the front of the body and connected with the sliding frame for operating the said frame to simultaneously swing the pedestals.

9. A carriage of the character specified, comprising a body, substantially V-shaped pedestals at the opposite sides of the body, each pedestal having a pair of diverging arms and being pivoted to the body at the junction of the arms, a wheel journaled on each arm of each pedestal, a frame mounted to slide on the under side of the body and connected with the pedestals, means at the front of the body and connected with the frame for moving the same, to bring the wheels of the rear arms of the pedestals into or out of contact with the supporting surface for the carriage, latch mechanism engaging the sliding frame for holding the pedestals with the wheels of the rear arms out of contact with the supporting surface for the carriage, a trip rod connected with the latch mechanism for releasing the same and arranged below the rear wheels when they are out of contact with the supporting surface for the carriage, and adapted to engage an obstruction to release the latch mechanism to permit the rear wheels to swing downwardly on to the obstruction, and means connected with the lever for operating the same, said means comprising a tongue pivoted to the lever and having latch mechanism for engaging the lever to hold the tongue rigid with the lever.

10. A carriage of the character specified, comprising a body, substantially V shaped pedestals at the opposite side of the body, each pedestal comprising a pair of diverging arms and being pivoted to the body at the junction of the arms, a wheel journaled on each arm of each pedestal, a frame mounted to slide on the under side of the body and connected with the pedestals, means at the front of the body and connected with the frame for moving the same to bring the wheels of the rear arms of the pedestals into or out of contact with the supporting surface for the carriage, latch mechanism engaging the sliding frame for holding the pedestals with the wheels of the rear arms out of contact with the supporting surface for the carriage, a trip rod connected with the latch mechanism for releasing the same and arranged below the rear wheels when they are out of contact with the supporting surface for the carriage, and adapted to engage an obstruction to release the latch mechanism to permit the rear wheels to swing downwardly on to the obstruction, and means connected with the lever for operating the same.

11. A carriage of the character specified, comprising a body, substantially V-shaped pedestals at the opposite side of the body, each pedestal comprising a pair of arms and being pivoted to the body at the junction of the arms, a wheel journaled on each arm of each pedestal, means for simultaneously swinging the pedestals to bring the wheels of the rear arms of the pedestals into or out of contact with the supporting surface for the carriage, latch mechanism for holding the pedestals with the wheels of the rear arms out of contact with the supporting surface of the carriage, a trip for releasing the latch mechanism arranged below the wheels of the rear arms when they are out of contact with the said supporting surface and adapted to engage an obstruction to release the latch mechanism to permit the wheels of the rear arms to swing down upon the obstruction, runners detachably connected with the body, and depending below the body to engage the supporting surface for the carriage when the wheels of the rear arms are swung downwardly, and means at the front of the body for operating the pedestal swinging means and releasable therefrom.

12. A carriage of the character specified, comprising a body, substantially V-shaped pedestals at the opposite side of the body, each pedestal comprising a pair of arms and being pivoted to the body at the junction of the arms, a wheel journaled on each arm of each pedestal, means for simultaneously swinging the pedestals to bring the wheels of the rear arms of the pedestals into or out of contact with the supporting surface for the carriage, latch mechanism for holding the pedestals with the wheels of the rear arms out of contact with the supporting surface of the carriage, a trip for releasing the latch mechanism arranged below the wheels of the rear arms when they are out of contact with the said supporting surface and adapted to engage an obstruction to release the latch mechanism to permit the wheels of the rear arms to swing down upon the obstruction, runners detachably connected with the body, and depending below the body to engage the supporting surface for the carriage when the wheels of the rear arms are swung downwardly.

13. A carriage of the character specified, comprising a body, substantially V-shaped pedestals at the opposite side of the body, each pedestal comprising a pair of arms and being pivoted to the body at the junction of the arms, a wheel journaled on each arm of each pedestal, means for simultaneously swinging the pedestals to bring the wheels of the rear arms of the pedestals into or out of contact with the supporting surface for the carriage, latch mechanism for holding the pedestals with the wheels of the rear arms out of contact with the supporting surface of the carriage, a trip for releasing the latch mechanism arranged below the wheels of the rear arms when they are out of contact with the said supporting surface and adapted to engage an obstruction to release the latch mechanism to permit the wheels of the rear arms to swing down upon the obstruction.

14. A carriage of the character specified, comprising a body, pedestals pivoted to the opposite sides of the body, a wheel journaled on each pedestal at the lower end thereof, means mounted to move longitudinally of the body and connected with the pedestals to simultaneously swing the same with respect to the body to raise and lower the body with respect to the wheels, runners connected with the body and depending below the same to engage the supporting surface of the carriage when the pedestals are swung in a direction to lift the wheels, latch mechanism for holding the body in lifted position with the wheels engaging the supporting surface and the runners out of contact therewith, means at the front of the body for releasing the latch mechanism, and means at the front of the body for operating the pedestal moving means.

15. A carriage of the character specified, comprising a body, pedestals pivoted to the opposite sides of the body, a wheel journaled on each pedestal at the lower end thereof, means mounted to move longitudinally of the body and connected with the pedestals to simultaneously swing the same with respect to the body to raise and lower the body with respect to the wheels, and runners connected with the body and depending below the same to engage the supporting surface of the carriage when the pedestals are swung in a direction to lift the wheels.

16. A carriage of the character specified, comprising a body, pedestals pivoted to the opposite sides of the body, a wheel journaled on each pedestal at the lower end thereof, runners connected with the body and depending below the same, and means for swinging the pedestals with respect to the body to lift the wheels to bring the runners into operative position, latch mechanism for holding the body in lifted position with the wheels engaging the supporting surface, means at the front of the body for releasing the latch mechanism, and means at the front of the body for operating the pedestal moving means.

17. A carriage of the character specified, comprising a body, pedestals pivoted to the opposite sides of the body, a wheel journaled on each pedestal at the lower end thereof, runners connected with the body and depending below the same, means for swinging the pedestals with respect to the body to lift the wheels to bring the runners into operative position, latch mechanism for holding the body in lifted position with the wheels engaging the supporting surface, and means at the front of the body for releasing the latch mechanism.

18. A carriage of the character specified, comprising a body, pedestals pivoted to the opposite sides of the body, a wheel journaled on each pedestal at the lower end thereof, runners connected with the body and depending below the same, and manually operated means for simultaneously swinging the pedestals into approximately vertical position to support the body with the runners out of contact with the supporting surface for the carriage or to swing the pedestals into inclined position to lift the wheel to bring the runners into operative position.

19. A carriage of the character specified, comprising a body, pedestals pivotally connected to the body, a wheel journaled on each pedestal at the end remote from the body, runners connected with the body and depending below the same, releasable latch mechanism for holding the pedestals in approximately vertical position and with the runners out of contact with the supporting surface for the carriage, and a trip for releasing the latch mechanism and arranged at the front of the body and adapted to be engaged when moved toward the body to release the latch mechanism.

GOLA DICK.

Witnesses:
ALBERT N. COOMBS,
HELEN L. COUNSELL.

Copies of this patent may be obtained for five cents each, by addressing the "Commissioner of Patents, Washington, D. C."